(12) United States Patent
Sei (10) Patent No.: US 10,888,963 B2
(45) Date of Patent: Jan. 12, 2021

(54) BLADE ASSEMBLING METHOD AND BLADE ASSEMBLING DEVICE FOR TORQUE CONVERTER

(71) Applicant: KANAE KOGYO Co., Ltd., Shizuoka (JP)

(72) Inventor: Yukio Sei, Shizuoka (JP)

(73) Assignee: KANAE KOGYO Co., Ltd., Shizuoka (JP)

( * ) Notice: Subject to any disclaimer, the term of this patent is extended or adjusted under 35 U.S.C. 154(b) by 144 days.

(21) Appl. No.: 16/308,051

(22) PCT Filed: Oct. 19, 2016

(86) PCT No.: PCT/JP2016/081028
§ 371 (c)(1),
(2) Date: Dec. 7, 2018

(87) PCT Pub. No.: WO2018/073923
PCT Pub. Date: Apr. 26, 2018

(65) Prior Publication Data
US 2019/0193215 A1    Jun. 27, 2019

(51) Int. Cl.
*B23P 19/04* (2006.01)
*F16H 41/28* (2006.01)
(Continued)

(52) U.S. Cl.
CPC ............ *B23P 19/02* (2013.01); *B23P 15/006* (2013.01); *B23P 21/00* (2013.01); *F16D 33/20* (2013.01); *F16H 41/28* (2013.01)

(58) Field of Classification Search
CPC ......... B23P 19/02; B23P 15/006; B23P 21/00; B23P 19/04; F16D 33/20; F16H 41/28
See application file for complete search history.

(56) References Cited

U.S. PATENT DOCUMENTS 3,137,915 A * 6/1964 Smirl .................. F16D 33/20
                                                        29/889.5
3,522,645 A * 8/1970 Kennicott ............... B23P 19/04
                                                        29/717
(Continued)

FOREIGN PATENT DOCUMENTS

JP    S58-142064 A    8/1983
JP    S63-103922 U    7/1988
(Continued)

OTHER PUBLICATIONS

International Search Report issued in PCT/JP2016/081028; dated Jan. 17, 2017.

*Primary Examiner* — Jun S Yoo
(74) *Attorney, Agent, or Firm* — Studebaker & Brackett PC (57) ABSTRACT

Provided is a blade assembling method for a converter, wherein a blade 20 held by blade holding means (adsorption part 152) is further relatively moved with respect to a shell 10, whereby, while remaining claws 21B and 21C of the blade 20 are pressed against the upper surface of the shell 10 in an obliquely forward and downward direction by the holding force of the blade holding means (adsorption part 152), the claws 21B and 21C are slid toward grooves 11B and 11C from the near side of the corresponding grooves 11B and 11C and inserted so as to fall in the grooves 11B and 11C to thereby insert all the claws 21A to 21C into all the corresponding grooves 11A to 11C, respectively.

9 Claims, 9 Drawing Sheets

(51) Int. Cl.
  *B23P 19/02* (2006.01)
  *B23P 21/00* (2006.01)
  *F16D 33/20* (2006.01)
  *B23P 15/00* (2006.01)

(56) References Cited

U.S. PATENT DOCUMENTS

| | | | | |
|---|---|---|---|---|
| 3,668,773 | A | * | 6/1972 | Achterberg ............. B23P 19/04 29/429 |
| 6,041,500 | A | * | 3/2000 | Terpstra ................ B23P 15/006 29/23.51 |
| 7,320,172 | B1 | * | 1/2008 | Kamiya ................ B23P 15/006 29/464 |

FOREIGN PATENT DOCUMENTS

| | | |
|---|---|---|
| JP | H03-068661 U | 7/1991 |
| JP | H09-014389 A | 1/1997 |
| JP | 2000-027973 A | 1/2000 |
| JP | 2014-196806 A | 10/2014 |
| JP | 2016-211628 A | 12/2016 |

* cited by examiner

BLADE ASSEMBLING METHOD AND BLADE ASSEMBLING DEVICE FOR TORQUE CONVERTER

TECHNICAL FIELD

The present invention relates to a blade assembling method and a blade assembling device for a torque converter.

BACKGROUND ART

A torque converter is configured in such a manner that blades including a plurality of claws at the outer edges thereof are assembled to the shell of an impeller or a turbine provided with multiple sets of groove lines at respective positions along a circumferential direction, the plurality of claws mutually corresponding to a plurality of grooves constituting the respective groove lines of the shell.

As described in Patent Document 1, a conventional blade assembling method for a torque converter includes: transferring a blade of which the blade surface on one side is adsorbed and held by an adsorption head; pressing a blade surface on a side opposite to the blade surface adsorbed by the adsorption head of the blade by a guiding pusher to guide a remaining claw into a corresponding groove after initial fitting in which at least one claw of the blade is inserted into a corresponding groove of a shell; and downwardly pressing the blade against the upper surface of the shell by a pressing pusher to thrust all the claws of the blade into all the corresponding grooves, respectively, up to roots thereof while supporting both blade surfaces of the blade by the adsorption head and the guiding pusher so as to be held.

CITATION LIST

Patent Document

Patent Document 1: Patent Publication JP2000-27973A

SUMMARY

Technical Problem

However, conventional technologies require the use of a complicated blade insertion mechanism that downwardly presses a blade against the upper surface of a shell by a pressing pusher while supporting both blade surfaces of the blade by an adsorption head and a guiding pusher so as to be held.

It is an object of the present invention to easily and smoothly assemble the claws of a blade to a plurality of corresponding grooves, respectively.

Solution to Problem

According to the present invention, there is provided a blade assembling method for a torque converter for assembling a blade having a plurality of claws at an outer edge thereof to a shell having multiple sets of groove lines at respective positions along a circumferential direction thereof, the plurality of claws mutually corresponding to a plurality of grooves constituting the respective groove lines, the blade assembling method including:

holding the blade by blade holding means and relatively moving the blade with respect to the shell, to thereby perform initial fitting by inserting at least one of the claws of the blade into a corresponding groove in the groove line of the shell, and after the insertion of the claw by the initial fitting, arranging a remaining claw of the blade on a near side of a corresponding groove of the shell along a movement direction in which the remaining claw of the blade moves with respect to the groove in the circumferential direction of the shell; and further relatively moving the blade held by the blade holding means in the movement direction with respect to the shell, and sliding the remaining claw of the blade toward the corresponding groove and inserting the remaining claw so as to fall in the groove while pressing the claw downwardly against an upper surface of the shell by a holding force of the blade holding means, to thereby insert all the claws into all the corresponding grooves, respectively, wherein when the blade held by the blade holding means is relatively moved with respect to the shell during the initial fitting, at least the one claw of the blade is arranged on the near side of the corresponding groove of the shell along the movement direction in which the claw of the blade moves with respect to the groove in the circumferential direction of the shell, and thereafter, the claw is slid in the direction toward the corresponding groove and inserted so as to fall in the groove while being pressed downwardly against the upper surface of the shell by the holding force of the blade holding means.

Advantageous Effects of Invention

According to the present invention, the claws of a blade can be easily and smoothly assembled to a plurality of corresponding grooves, respectively.

BRIEF DESCRIPTION OF DRAWINGS

FIG. 2 shows a shell, FIG. 2(A) being a perspective view, FIG. 2(B) being a side view, FIG. 2(C) being a bottom view.

FIG. 7 shows blade insertion means, FIG. 7(A) being a schematic perspective view, FIG. 7(B) being a schematic explanatory view, FIG. 7(C) being a schematic perspective view showing a blade insertion process.

DESCRIPTION OF EMBODIMENTS

Figure 1:
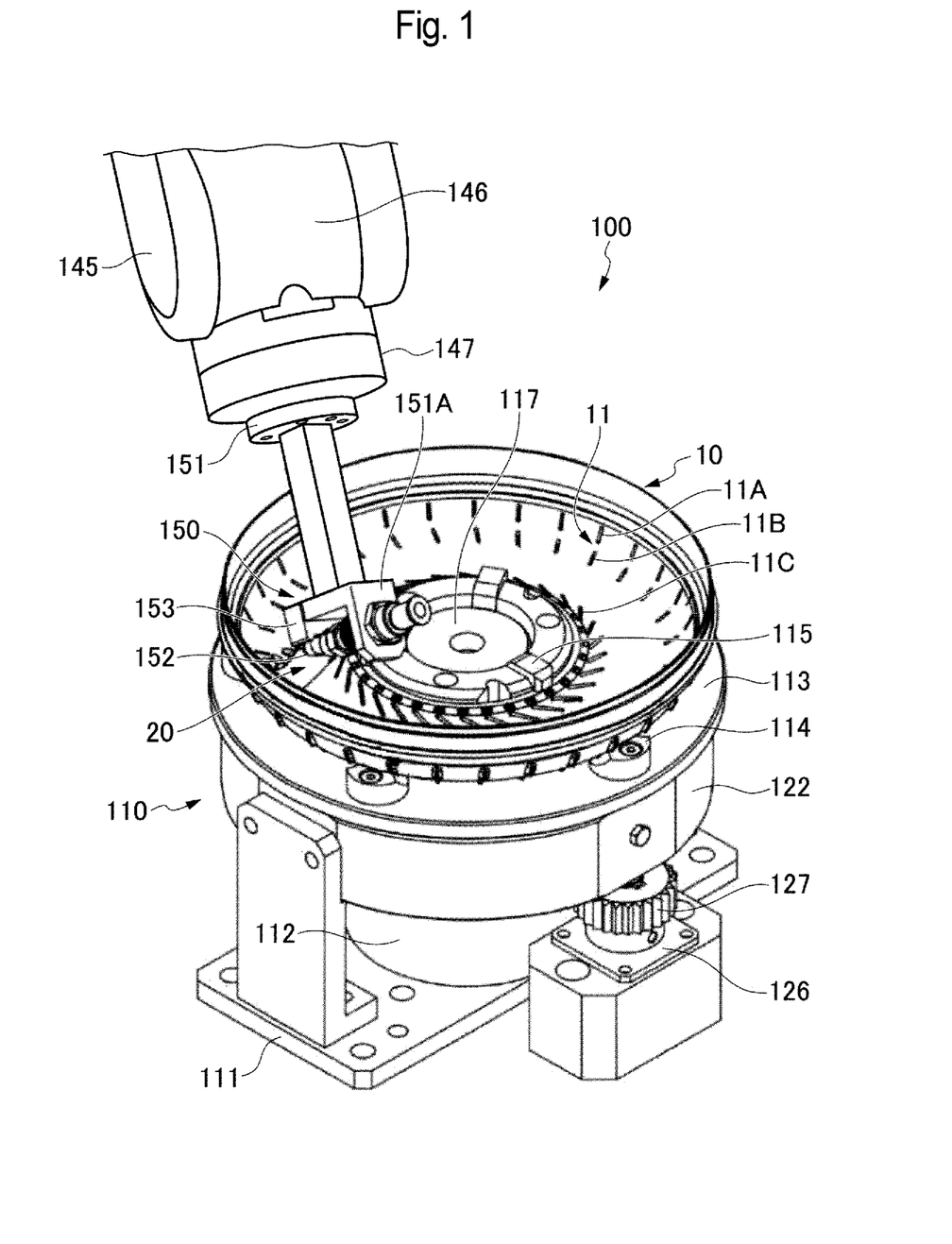
FIG. 1 is a schematic perspective view showing a blade assembling device.

A blade assembling device 100 for a torque converter shown in FIG. 1 is used to automatically assemble multiple blades 20 to a shell 10 of the impeller or the turbine of a torque converter.

Figure 2:
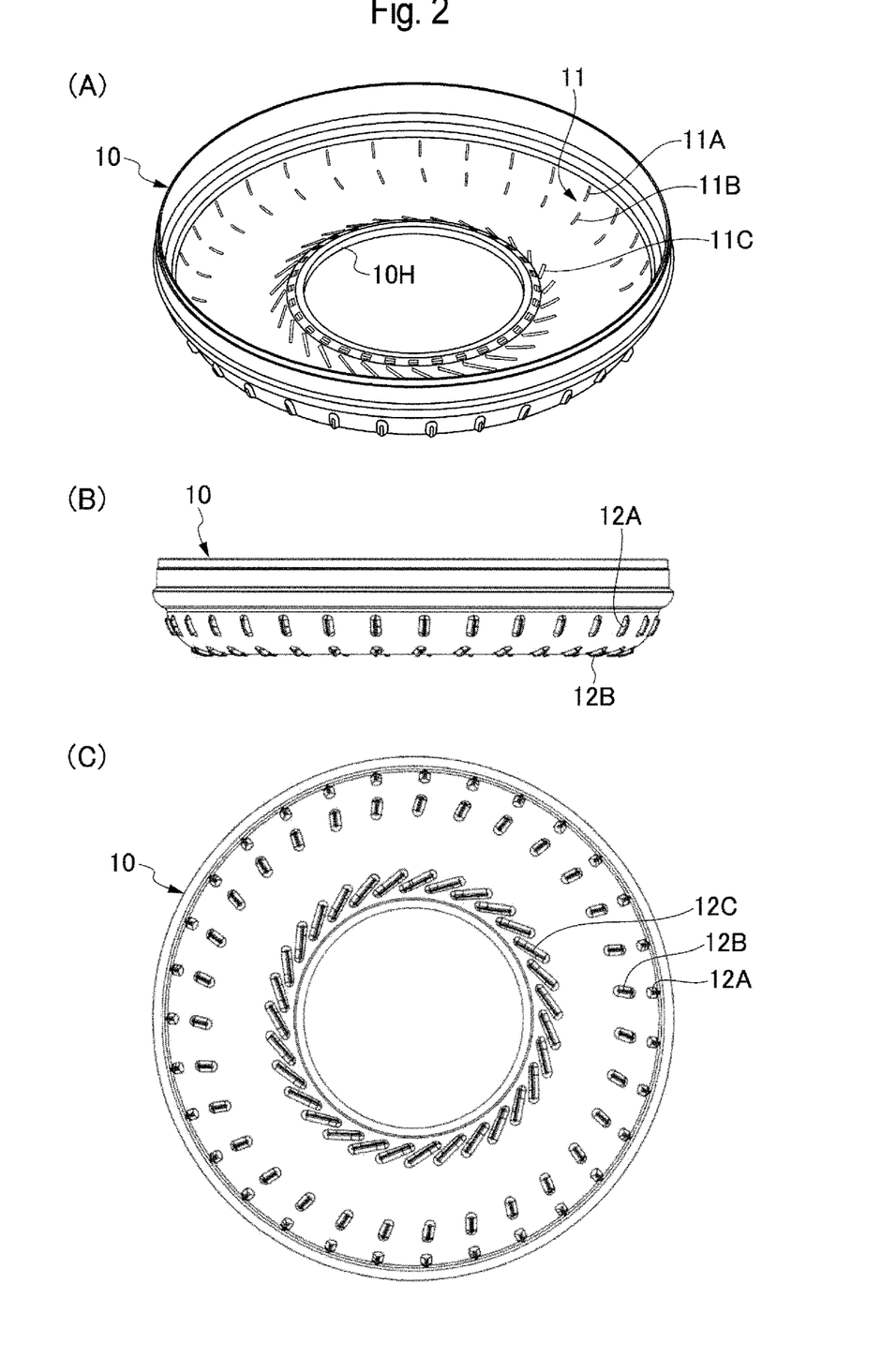

As shown in FIG. 2, the shell 10 is curvature-formed into a circular bowl shape and includes an attachment hole 10H at the central part thereof. The shell 10 has, on the curved inner surface thereof, multiple sets of groove lines 11 at respective positions at constant intervals along a circumferential direction, and the respective groove lines 11 are constituted by a plurality of (three in the present embodiment) grooves 11A to 11C having a prescribed arc shape. The shell 10 includes, on the curved outer surface thereof, respective protrusion parts 12A to 12C protruding outward at respective positions corresponding to the grooves 11A to 11C of the respective groove lines 11.

Figure 3:
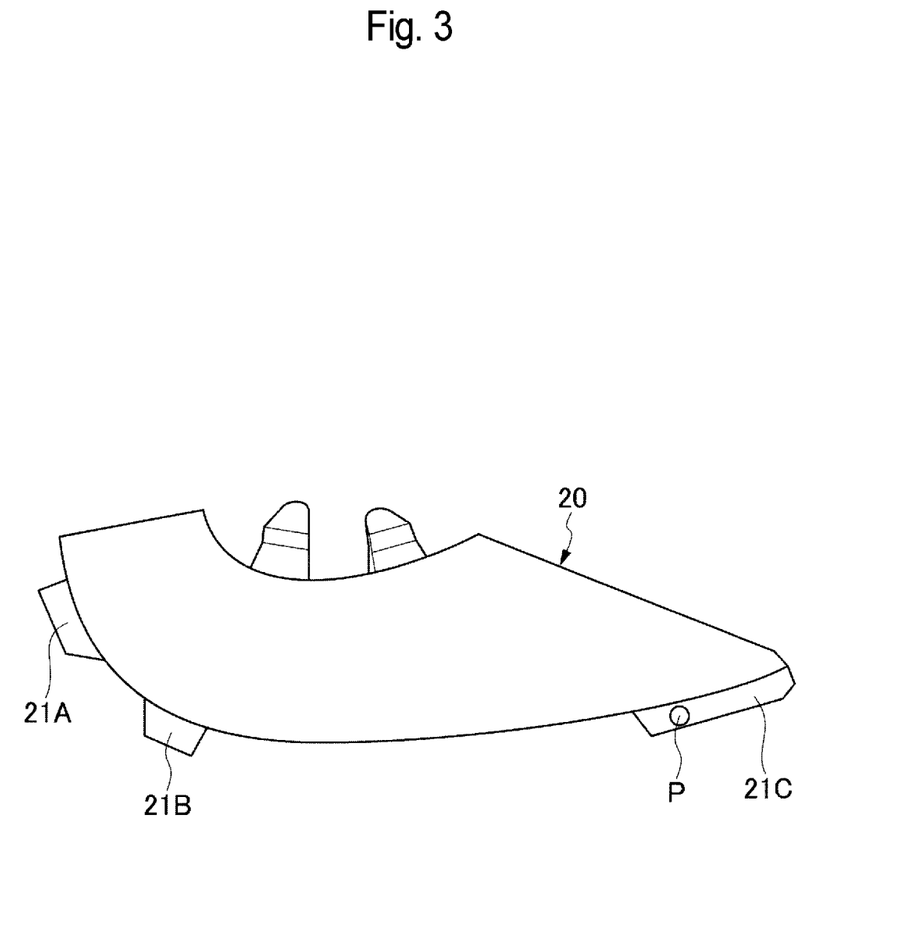
FIG. 3 is a schematic front view showing a blade.

Each of the blades 20 is constituted by a blade-shaped plate material molded into a three-dimensional shape and has a plurality of (three in the present embodiment) claws 21A to 21C protruding from the lower outer edge thereof. At least one of the claws 21A to 21C (the claw 21C in the present embodiment) includes, on the lateral surface thereof, an emboss-shaped protrusion P to be pressed into the groove 11C (the claw 21C may include a curvature part or the like to be pressed into the groove 11C).

The claws 21A to 21C of the blade 20 are inserted into the grooves 11A to 11C of the shell 10, respectively, up to the roots thereof, and all the claws 21A to 21C of one blade 20 are assembled to all the grooves 11A to 11C in one corresponding set of the groove lines of the shell 10, respectively. This assembling operation is repeatedly performed on all the sets of the groove lines 11 of the shell 10 to manufacture a torque converter constituent component.

The blade assembling device 100 has a shell holding board 110 for holding the shell 10.

Figure 4:
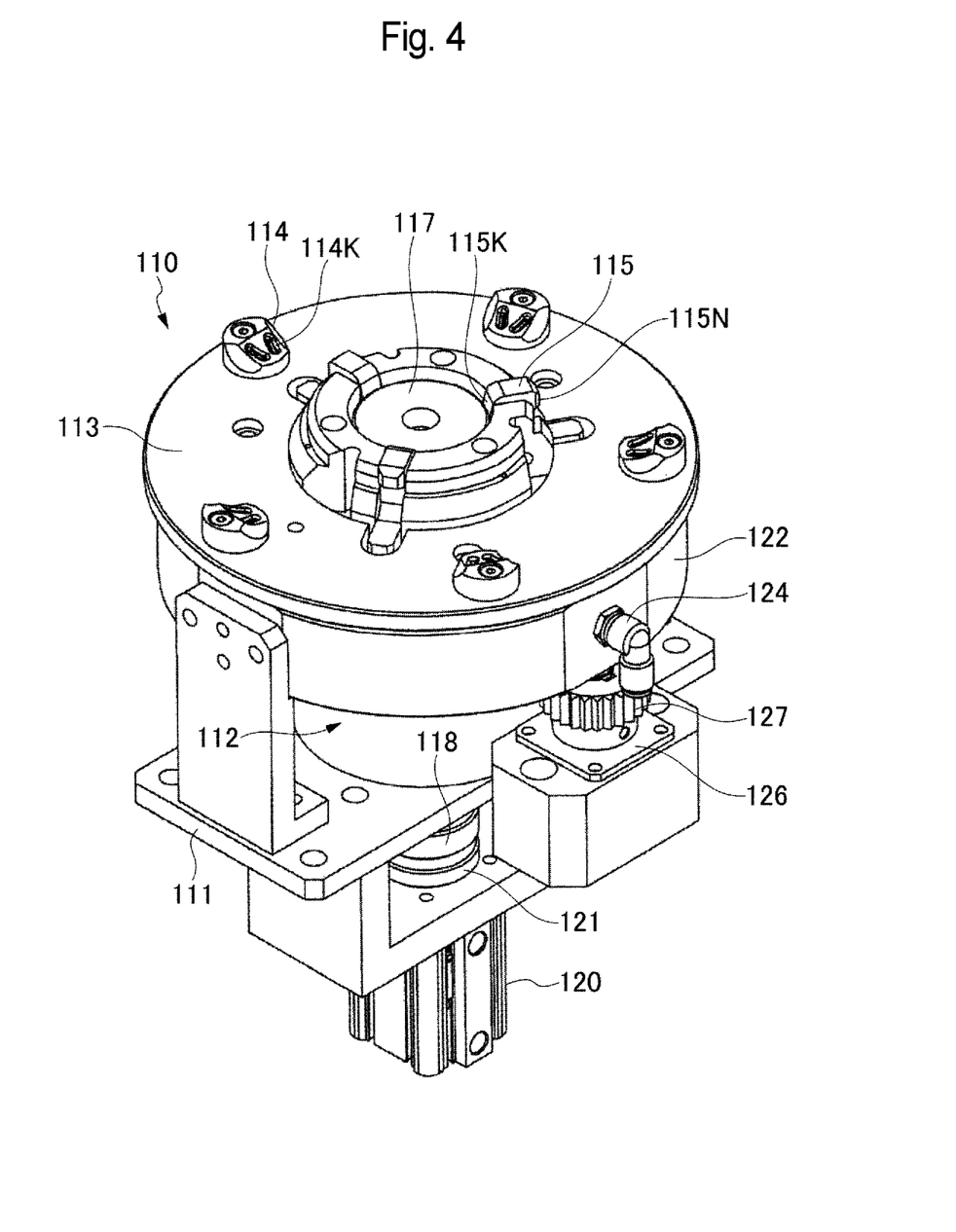
FIG. 4 is a schematic perspective view showing a shell holding board.
Figure 5:
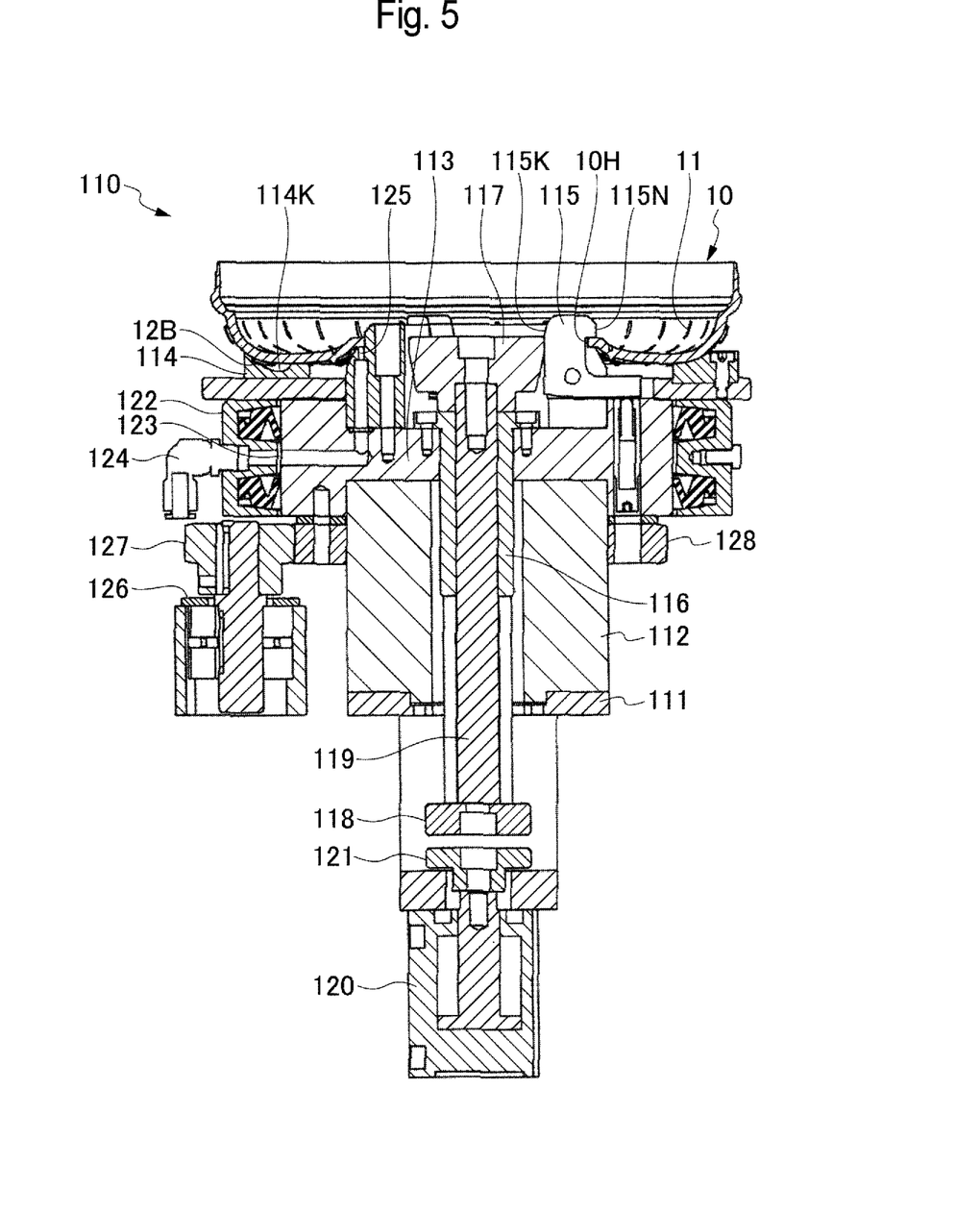
FIG. 5 is a cross-sectional view showing the shell holding board.

As shown in FIGS. 4 and 5, the shell holding board 110 supports a direct drive motor 112 in a state of being mounted on a base 111 and has a shell holding table 113 fixed to the upper part of the motor 112. The shell holding board 110 includes shell holding seats 114 at a plurality of positions (five positions in the present embodiment) in a circumferential direction on the upper surface of the shell holding table 113. The shell holding board 110 pivotally supports clamp claws 115 extending in the radius direction of a central hole at a plurality of positions (three positions in the present embodiment) about the central hole of the shell holding table 113. The shell holding board 110 causes a slide rod 118 integrated with a clamp head 117 to be slidably inserted into the inner periphery of a collar 116 included in the central hole of the shell holding table 113 and the central hole of the motor 112, and supports the clamp head 117 and the slide rod 118 to be freely linearly movable in a vertical direction along the hole axis of the collar 116. The clamp head 117 is urged downward at all times by a spring 119 interposed between the collar 116 and the lower end of the slide rod 118. By downward movement based on the urging force, the clamp head 117 contacts shoulder parts 115K of the respective clamp claws 115 from above and is pushed so as to spread the clamp claws 115 outward. The inner peripheral edge of the attachment hole 10H of the shell 10 placed on the shell holding seats 114 of the shell holding table 113 is clamped by tip end claw parts 115N of the respective spread clamp claws 115, and the curved outer surface of the shell 10 is fixedly seated on the shell holding seats 114. Thus, the shell 10 is held on the shell holding table 113. On this occasion, at least ones (the convex parts 12C in the present embodiment) of the respective convex parts 12A to 12C on the curved outer surface of the shell 10 fall in and engage concave parts 114K provided on the shell holding seats 114 beforehand at the time of being placed in the shell holding seats 114. The clamp head 117 supports a push-up cylinder 120 in a state of being suspended from the base 111, and moves upward so as to separate from the clamp claws 115 when a piston rod 121 protruding from the cylinder 120 pushes up the slide rod 118 against the urging force of the spring 119. Thus, the respective clamp claws 115 swing inward due to gravity applied to the clamp claws 115 and cancel the clamping of the tip end claw parts 115N with respect to the inner peripheral edge of the attachment hole 10H of the shell 10.

The shell holding board 110 surrounds the outer peripheral part of the shell holding table 113 with an annular housing 122 provided on the base 111. The shell holding board 110 has an annular air chamber 123 at the inner peripheral part of the annular housing 122 surrounding the outer peripheral part of the shell holding table 113. The shell holding board 110 is capable of applying air pressure to the annular air chamber 123 through an air pressure supply pipe 124 connected to the annular housing 122 and ejecting the air pressure applied to the annular air chamber 123 above the shell holding table 113 from an air pressure ejection path 125 bored in the shell holding table 113. The seating of the curved outer surface of the shell 10 on the shell holding seats 114 of the shell holding table 113 can be detected when a pressure detector provided in the air pressure supply pipe 124 detects a reduction in an amount of air ejected from the air pressure ejection path 125.

The shell holding board 110 intermittently moves (rotates in the present embodiment) the shell holding table 113 in a forward direction (an Na direction in FIG. 8) with the motor 112, and positions a workpiece assembling part of the shell 10 held on the shell holding table 113 (the groove line 11 of the shell 10 to which one of the blades 20 is assembled this time in the present embodiment) at a blade assembling operation position (workpiece assembling operation position) by a robot 140 that will be described later. On this occasion, the shell holding board 110 has, in the output path of the motor 112, a one-way clutch 126 that allows the driving of the motor 112 by which the shell holding table 113 is rotated in the forward direction and that prohibits the driving of the motor 112 by which the motor 112 is rotated in a direction opposite to the forward direction. That is, the one-way clutch 126 is fixedly supported by the base 111, and a gear 127 provided on the rotation shaft of the one-way clutch 126 meshes with a gear 128 provided on the outer peripheral part of the rotor of the motor 112.

In order to assemble the blades 20 to the shell 10, the blade assembling device 100 has the robot 140 that holds the blades 20 and relatively moves the blades 20 with respect to the shell 10 held on the shell holding board 110.

Figure 6:
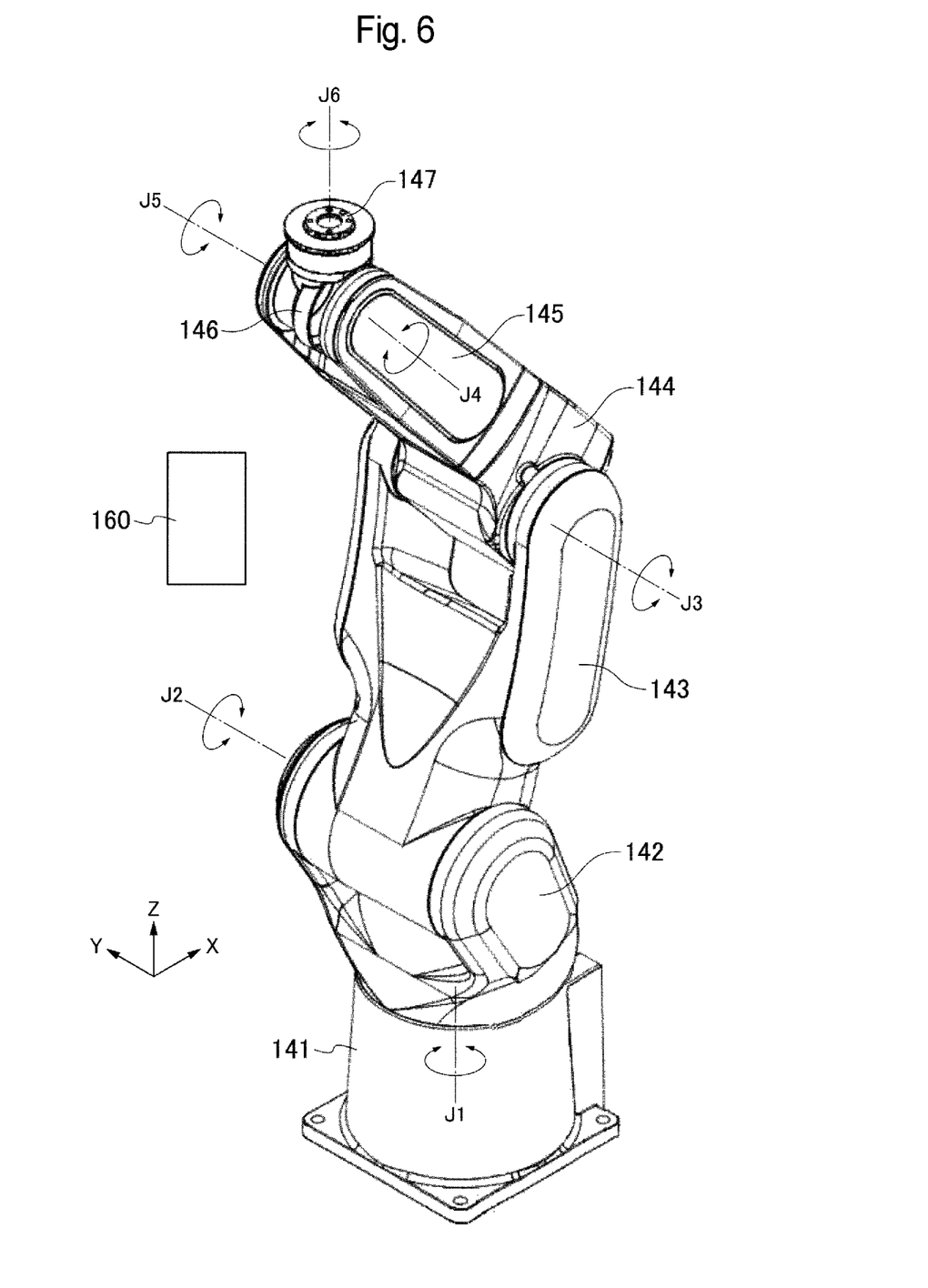
FIG. 6 is a schematic perspective view showing a robot.

As shown in FIG. 6, the robot 140 has, on a robot fixation board 141, a robot turning base 142, an upper arm 143, a front arm 144, a wrist twisting member 145, a wrist bending member 146, and a wrist rotation member 147 in an order from the side of the robot fixation board 141.

Here, the robot 140 is a six-axes articulated robot constituted by a first axis J1, a second axis J2, . . . , and a sixth axis J6 in the order from the side of the robot fixation board 141. The first to third axes are basic three axes, and the fourth to sixth axes are wrist three axes. Each of the axes is a turning axis, and the turning movement directions thereof are denoted by arrows.

Now, when a coordinate system in which an upper right direction is an X axis, a perpendicular direction is a Y axis, and an upper direction is a Z axis is set in space shown in FIG. 6 in which the robot 140 is installed, the directions of the turning movements of the respective axes are defined as follows.

First axis J1: an axis about which the robot turning base 142 is caused to turn with respect to the robot fixation board 141 around an axis line parallel to the Z axis Second axis J2: an axis about which the upper arm 143 is caused to move back and forth with respect to the robot turning base 142 around an axis line parallel to the Y axis Third axis J3: an axis about which the front arm 144 is caused to move vertically with respect to the upper arm 143 around an axis line parallel to the Y axis Fourth axis J4: an axis about which the wrist twisting member 145 is caused to rotate with respect to the front arm 144 around an axis line parallel to the X axis or the Z axis orthogonal to the Y axis Fifth axis J5: an axis about which the wrist bending member 146 is caused to swing vertically with respect to the wrist twisting member 145 around an axis line parallel to the Y axis Sixth axis J6: an axis about which the wrist rotation member 147 is caused to rotate with respect to the wrist bending member 146 around an axis line parallel to the X axis or the Z axis orthogonal to the Y axis Further, at the upper part of the robot turning base 142 turnably mounted on the robot fixation board 141, a first-axis driving motor M1, a second-axis driving motor M2, and speed reducers thereof are mounted. Inside the robot fixation board 141 and the robot turning base 142, a driving element for transmitting the driving force of the first-axis driving motor M1 to the first axis J1 is arranged. Inside the robot turning base 142 and the upper arm 143 turnably coupled to the robot turning base 142, a driving element for transmitting the driving force of the second-axis driving motor M2 to the second axis J2 is arranged.

Further, at the base end of the front arm 144 that is turnably coupled to the upper arm 143, a third-axis driving motor M3 and a speed reducer thereof are mounted. Inside the upper arm 143 and the front arm 144, a driving element for transmitting the driving force of the third-axis driving motor M3 to the third-axis J3 is arranged.

Further, at the base end of the front arm 144, driving motors M4 to M6 of the fourth to sixth axes and speed reducers thereof are mounted. Inside the front arm 144 and the wrist twisting member 145 turnably coupled to the front arm 144, a driving element for transmitting the driving force of the fourth-axis driving motor M4 to the fourth axis J4 is arranged. Inside the front arm 144, the wrist twisting member 145, and the wrist bending member 146 turnably coupled to the wrist twisting member 145, a driving element for transmitting the driving force of the fifth-axis driving motor M5 to the fifth axis J5 is arranged. Inside the front arm 144, the wrist twisting member 145, the wrist bending member 146, and the wrist rotation member 147 turnably coupled to the wrist bending member 146, a driving element for transmitting the driving force of the sixth-axis driving motor M6 to the sixth axis J6 is arranged.

Figure 7:
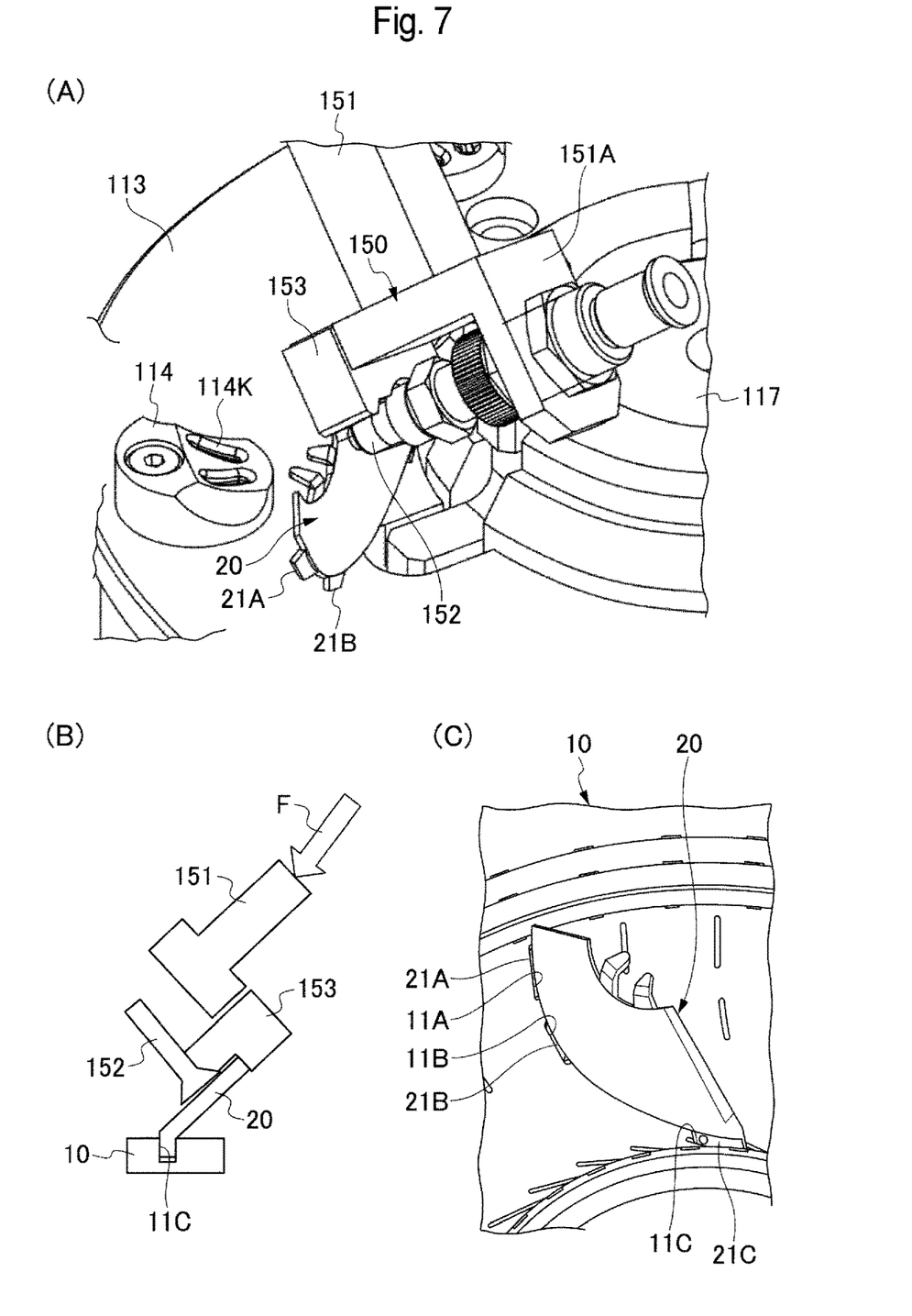

In the robot 140, the wrist rotation member 147 serving as an arm tip end in the present embodiment is provided with blade insertion means 150. As shown in FIGS. 1 and 7, the blade insertion means 150 has a connector 151 attached to and detached from the wrist rotation member 147 of the robot 140, an adsorption part 152 serving as blade holding means supported by an attachment part 151A provided at the connector 151, and a pressing part 153 supported by the attachment part 151A of the connector 151. The adsorption part 152 is configured by an adsorption pad or the like connected to a vacuum supply pipe, and adsorbs and holds the blade surfaces of one side of each of the blades 20 supplied from a blade supply device not shown. When pressed against the curved inner surface (the upper surface) of the shell 10, the blade 20 adsorbed by the adsorption part 152 can be displaced with respect to the arm tip end of the robot 140 (the wrist rotation member 147) by an amount corresponding to the elastic deformation of a rubber pad or the like constituting the adsorption part 152. When the claws 21A to 21C of the blade 20 are inserted into the grooves 11A to 11C of the shell 10, respectively, the pressing part 153 contacts the upper outer edge of the blade 20 on a side opposite to the lower outer edge at which the claws 21A to 21C are provided and applies a downward pressing force to the upper surface of the shell 10 to the blade 20.

Based on a control program provided in the control unit 160, the robot 140 repeatedly actuates the blade insertion means 150, relatively moves the blade 20 held by the adsorption part 152 with respect to the shell 10 in the manner described below, and inserts the claws 21A to 21C of the blade 20 into the corresponding grooves 11A to 11O of the shell 10, respectively, as shown in FIG. 7(C), for all the sets of the groove lines 11 of the shell 10 according to the following operations (1) to (7). Note that the control program provided in the control unit 160 can be recorded and used on a computer-readable recording medium.

(1) The shell 10 is seated on the shell holding seats 114 of the shell holding table 113 in the shell holding board 110. When it is detected by the detection result of the pressure detector provided in the air pressure supply pipe 124 that the curved outer surface of the shell 10 has been seated on the shell holding seats 114 of the shell holding table 113, the clamp claws 115 are clamped to the inner peripheral edge of the attachment hole 10H of the shell 10 to hold the shell 10 on the shell holding table 113.

(2) The shell holding table 113 is intermittently rotated by the motor 112 of the shell holding board 110 to position the workpiece assembling part of the shell 10 held on the shell holding table 113 (the groove line 11 of the shell 10 to which the blade 20 is assembled this time) at a blade assembling operation position by the robot 140.

Figure 8:
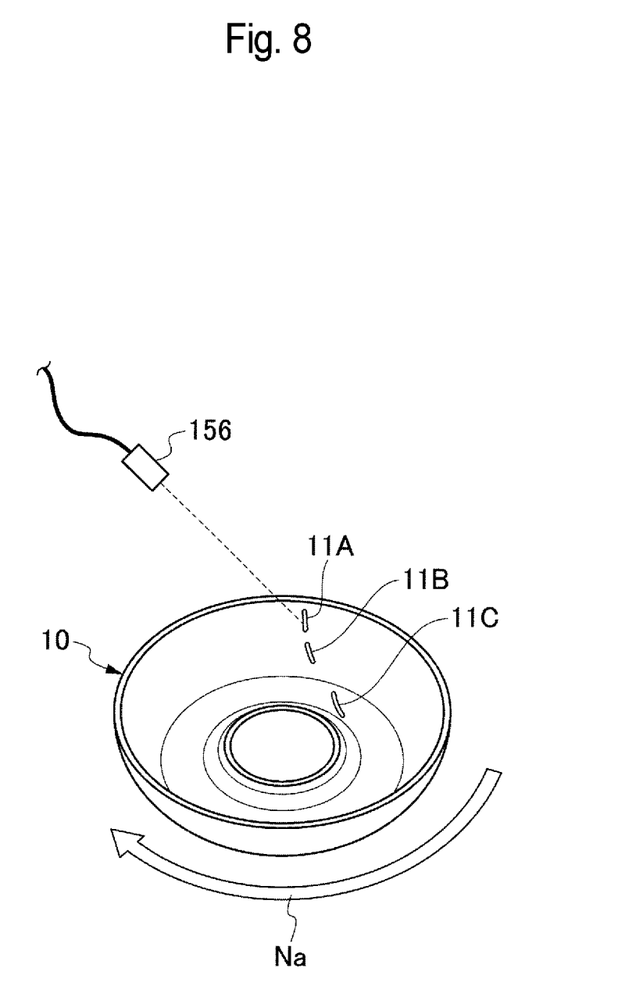
FIG. 8 is a schematic perspective view showing a groove line provided in the shell.

The positioning of the blade assembling operation position of the shell 10 is performed in the manner described in the following item i or ii.

i. As shown in FIG. 8, the positioning of the groove line 11 of the shell 10 to which the blade 20 is to be first assembled is performed in such a manner as to stop the motor 112 when a laser sensor 156 detects that the groove line 11 (the groove 11A of the groove line 11) of the shell 10 corresponds to the prescribed laser light irradiation position of the laser sensor 156.

ii. The groove lines 11 of the shell 10 to which the second and subsequent blades 20 are to be assembled is performed in such a manner as to intermittently rotate the motor 112 in an Na direction in FIG. 8 by an amount corresponding to the interval between the adjacent groove lines 11 for each completion of the assembling of the blades 20.

(3) By the adsorption part 152 of the blade insertion means 150 provided at the wrist rotation member 147 of the robot 140, the blade surface of one side of the blade 20 supplied from the blade supply device not shown is adsorbed and held. The robot 140 identifies the blade 20 with a camera not shown, and adsorbs and holds the blade 20 by the adsorption part 152 so that the blade 20 takes a constant relative position and posture with respect to the adsorption part 152.

(4) The robot 140 relatively moves at least one of the claws (the claw 21A in the present embodiment) of the blade 20 held by the adsorption part 152 with respect to the groove 11A of the shell 10 so as to be inserted and initially fitted into a corresponding groove (a groove 11A in the present embodiment) of a groove line 11 in the shell 10 held on the shell holding board 110. The initial fitting is performed in the manner described in the following item i or ii.

i. The claw 21A of the blade 20 held by the adsorption part 152 is moved toward the groove 11A of the shell 10 and directly inserted into the groove 11A by the adsorption force of the adsorption part 152.

ii. When the blade 20 held by the adsorption part 152 serving as the blade holding means is relatively moved with respect to the shell 10, the claw 21A of the blade 20 is arranged on the near side of the corresponding groove 11A in the circumferential direction of the shell 10 (on the near side of the groove 11A along a movement direction (an arrow A direction in FIG. 9(B)) in which the robot 140 moves the claw 21A of the blade 20 with respect to the groove 11A of the shell 10) (a Ka position in FIG. 9(A)). After that, while being pressed in an oblique downward direction (or "a downward direction" perpendicular to the upper surface of the shell 10) against the upper surface (the curved inner surface) of the shell 10 by the adsorption force (holding force) of the adsorption part 152, the claw 21A is slid in the arrow A direction in FIG. 9(B) from the near side of the corresponding groove 11A to the groove 11A and inserted so as to fall in the groove 11A.

Figure 9:
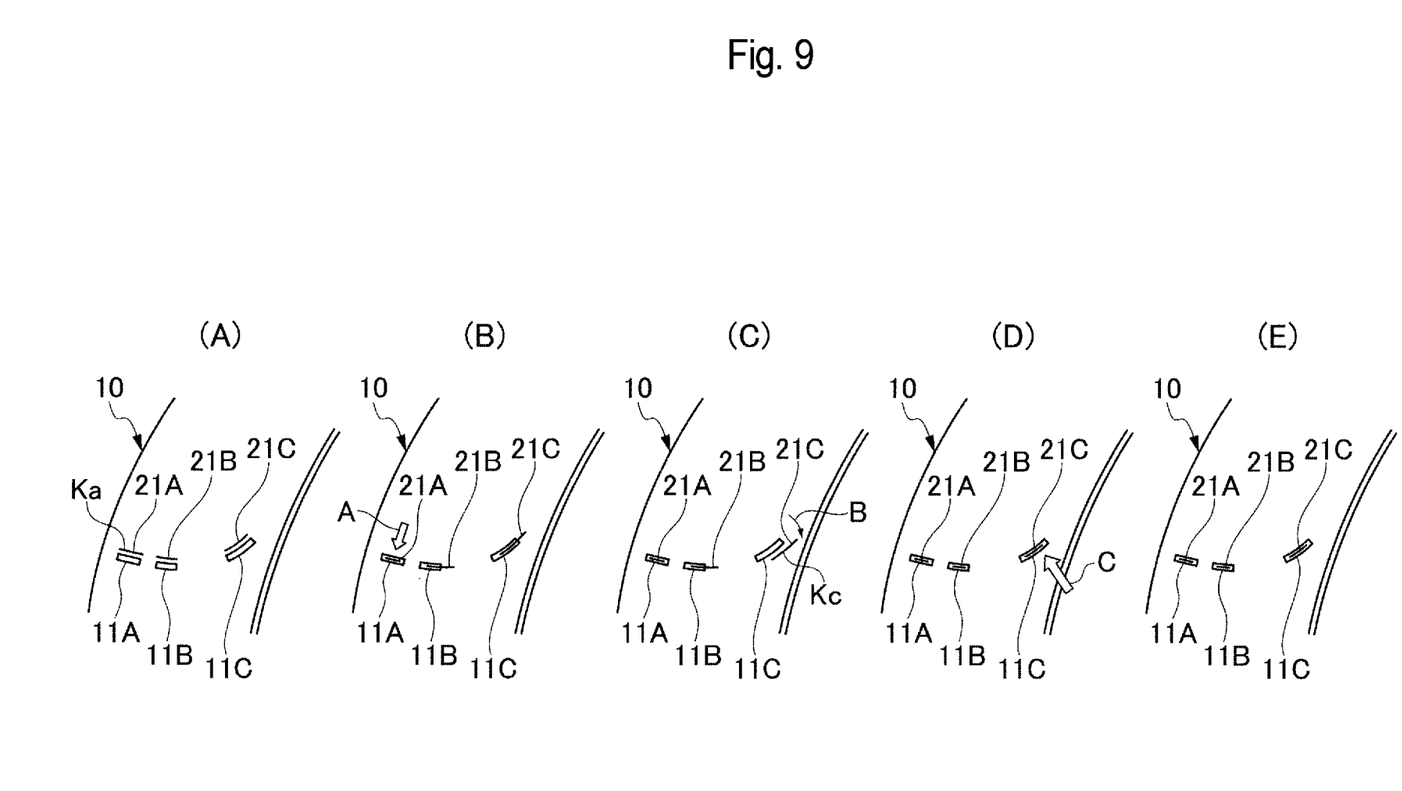
FIG. 9 is a process view showing the process of inserting the respective claws of a blade.

(5) The robot 140 moves down the blade 20 by the adsorption part 152 to slightly insert the tip end of the claw 21B into the groove 11B with the claw 21A of the blade 20 inserted into the groove 11A of the shell 10 in the above operation (4), and twists the blade 20 in a B direction in FIG. 9(C) by an amount corresponding to the looseness of the claws 21A and 21B with respect to the grooves 11A and 11B (the claw 21C is positioned on the far side of a groove 11C across the groove 11C).

(6) After the insertion of the claws 21A and 21B of the blades 20 in the above operations (4) and (5), the robot 140 arranges the remaining claw 21C of the blade 20 on the near side (the near side (called the near side of the far side) of the groove 11C along a movement direction (an arrow C direction in FIG. 9(D)) in which the robot 140 moves the claw 21C of the blade 20 to the groove 11C from a position across the upper part of the groove 11C of the shell 10 in the above operation (5)) (a Kc position in FIG. 9(C)) of the groove 110 in the circumferential direction of the shell 10. After that, while pressing the claw 21C in an oblique downward direction (or a "downward direction" perpendicular to the upper surface of the shell 10) against the upper surface (the curved inner surface) of the shell by the adsorption force of the adsorption part 152, the robot 140 slides the claw 21C in the arrow C direction from the near side of the corresponding groove 110 toward the groove 110 and inserts the same so as to fall in the groove 110 (FIG. 9(D)). Thus, all the claws 21A to 21C of the blade 20 are inserted into all the corresponding grooves 11A to 11C of the shell 10, respectively.

Note that a reason why the claw 21C of the blade 20 is positioned on the near side of the far side of the groove 11C across the groove 11C of the shell 10 in (5) above is that the claw 21C can be smoothly fell and inserted into the groove 11C when pushed forward in the arrow C direction in FIG. 9(D) with respect to the groove 11C due to the shape of the curved inner surface around the groove 11C of the shell 10. Accordingly, depending on the shape of the curved inner surface around the groove 11C of the shell 10, the claw 21C of the blade 20 is not required to be positioned on the near side of the far side across the upper part of the groove 11C of the shell 10 in (5) above. Therefore, in this case, the claw 21C may be slid toward the groove 11C from the near side of the groove 11C without passing through the groove 11C and inserted so as to fall in the groove 11C.

(7) After the insertion of all the claws 21A to 21C of the blade 20 into all the corresponding grooves 11A to 11C of the shell 10, respectively, in the above operation (6), the robot 140 downwardly presses the blade 20 against the upper surface of the shell 10 by a pressing force F (FIG. 7(B)) of the pressing part 153 of the blade insertion means 150 and thrusts all the claws 21A to 21C into all the corresponding grooves 11A to 11C, respectively, up to the roots thereof (FIG. 9(E)). As shown in FIG. 7(B), the pressing part 153 presses, in an oblique forward and downward direction, the upper outer edge on a side opposite in a vertical direction to the lower outer edge of the blade 20 at which the claws 21A to 21C are provided.

Thus, the protrusion P provided at the lateral surface of the claw 21C (or the curvature part or the like provided at the claw 21C) in the blade 20 is pressed into the groove lateral wall of the groove 11C of the shell 10, and the fitting of all the claws 21A to 21C is completed without the possibility of the omission of all the grooves 11A to 11C.

Note that the adsorption part 152 of the blade insertion means 150 bends by an amount corresponding to the elastic deformation of its rubber pad or the like to displaceably hold the blade 20 in the respective operations (4) to (7). Accordingly, when the claws 21A to 21C of the blade 20 are inserted into the grooves 11A to 11C of the shell 10, respectively, or when the claws 21A to 21C are thrusted into the grooves 11A to 11C, respectively, up to the roots thereof by the pressing part 153, the adsorption part 152 flexibly holds the claws 21A to 21C of the blade 20 so as to be capable of being inserted or thrusted along the groove directions of the grooves 11A to 11C, respectively.

Further, when all the claws 21A to 21C of the blade 20 can be inserted into the grooves 11A to 11C of the shell 10, respectively, in the above operations (4) to (6), the robot 140 is not required to perform the pressing operation using the pressing part 153 in the above operation (7).

Accordingly, the following effects are produced according to the present embodiment.

(a) At least one claw 21A of a blade 20 with its blade surface on one side held by the adsorption part 152 serving as the blade holding means is inserted and initially fitted into a corresponding groove 11A of the shell 10, while remaining claws 21B and 21C of the blade 20 are arranged on the near side of corresponding grooves 11B and 11C in the circumferential direction of the shell 10 during the initial fitting. Subsequently, while being pressed downward against the upper surface of the shell 10 by the holding force of the adsorption part 152, the remaining claws 21B and 21C of the blade 20 are slid from the near side of the corresponding grooves 11B and 11C toward the grooves 11B and 11C, respectively and inserted so as to fall in the grooves 11B and 11C. Thus, all the claws 21A to 21C are inserted into all the corresponding grooves 11A to 11C, respectively.

Accordingly, only by holding the blade 20 by the adsorption part 152 and relatively moving the blade 20 held by the adsorption part 152 with respect to the shell 10, the claws 21A to 21C of the blade 20 can be easily and reliably inserted into the plurality of corresponding grooves 11A to 11C of the shell 10, respectively, as described above. Thus, the claws 21A to 21C of the blade 20 can be easily and smoothly assembled to the plurality of corresponding grooves 11A to 11C of the shell 10, respectively.

(b) When a blade 20 held by the adsorption part 152 is relatively moved with respect to the shell 10 during the initial fitting, at least one claw 21A of the blade 20 is arranged on the near side of a corresponding groove 11A in the circumferential direction of the shell 10. After that, while being pressed downward against the upper surface of the shell 10 by the holding force of the adsorption part 152, the claw 21A is slid toward the groove 11A and inserted so as to fall in the groove 11A.

Accordingly, during the initial fitting of at least one claw 21A of a blade 20 as well, the claw 21A of the blade 20 can be easily and reliably inserted into a corresponding claw 11A of the shell 10 as described above only by relatively moving the blade 20 held by the adsorption part 152 with respect to the shell 10.

(c) After the insertion of all the claws 21A to 21C of the blade 20 into all the corresponding grooves 11A to 11C, respectively, the blade 20 is downwardly pressed against the upper surface of the shell 10 by the pressing force of the blade 20, and all the claws 21A to 21C are thrusted into all the corresponding grooves 11A to 11C, respectively, up to the roots thereof.

Accordingly, even in a case in which claws 21A to 21C of a blade 20 are required to be manually hammered to be fitted into grooves 11A to 11C of the shell 10, the all the claws 21A to 21C of the blade 20 can be easily and reliably thrusted into all the corresponding grooves 11A to 11C of the shell 10, respectively, by a mechanical pressing operation.

(d) The blade holding means bends by an amount corresponding to the elastic deformation of its rubber pad or the like and displaceably holds a blade 20. Accordingly, when claws 21A to 21C of the blade 20 are inserted into a plurality of corresponding grooves 11A to 11C of the shell 10, respectively, or when the claws 21A to 21C are thrusted into the corresponding grooves 11A to 11C, respectively, up to the roots thereof, the claws 21A to 21C of the blade 20 can be flexibly held so as to be capable of being naturally inserted or thrusted along the groove directions of the corresponding grooves 11A to 11C. Thus, the above blade assembling operations (a) to (c) can be easily and smoothly automated.

(e) By the provision of the blade insertion means 150 at the tip end of the arm of the robot 140, the above blade assembling operations (a) to (c) can be easily and smoothly automated by the robot 140.

The embodiment of the present invention is described in detail above. However, the specific configuration of the present invention is not limited to the embodiment, and the modification or the like of a design is also included in the present invention without departing from scope of the present invention. For example, the blade holding means of the present invention is not limited to the adsorption part 152 of the above embodiment so long as the blade holding means can hold a blade, and mechanical chuck means, magnetic adsorption means, or the like may be used.

Further, the blade holding means of the present invention is only required to be one that holds a blade and is not limited to one that necessarily holds the blade surface of a blade.

Further, the blade assembling method and the blade assembling device for a torque converter according to the present invention may use a dedicated machine, besides an N-axes articulated robot such as a six-axes robot, a SCARA robot, and a robot such as a parallel link robot.

Industrial Applicability

According to the present invention, the claws of a blade can be easily and smoothly assembled to a plurality of corresponding grooves, respectively, in a blade assembling method and a blade assembling device for a torque converter.

REFERENCE SIGNS LIST

10 Shell
11 Groove line
11A to 11C Groove
20 Blade
21A to 21C Claw
100 Blade assembling device
110 Shell holding board
140 Robot
150 Blade insertion means
152 Adsorption part (blade holding means)
153 Pressing part

What is claimed is:

1. A blade assembling method for a torque converter for assembling a blade having a plurality of claws at an outer edge thereof to a shell having multiple sets of groove lines at respective positions along a circumferential direction thereof, the plurality of claws mutually corresponding to a plurality of grooves constituting the respective groove lines, the blade assembling method comprising:

holding the blade by blade holding means and relatively moving the blade with respect to the shell, to thereby perform initial fitting by inserting at least one of the claws of the blade into a corresponding groove in the groove line of the shell, and after the insertion of the at least one of the claws by the initial fitting, arranging a remaining claw of the blade on a near side of a corresponding groove of the shell along a movement direction in which the remaining claw of the blade moves with respect to the corresponding groove in the circumferential direction of the shell; and further relatively moving the blade held by the blade holding means in the movement direction with respect to the shell, and sliding the remaining claw of the blade toward the corresponding groove and inserting the remaining claw so as to fall in the corresponding groove while pressing the remaining claw downwardly against an upper surface of the shell by a holding force of the blade holding means, to thereby insert all the plurality of claws into all the corresponding grooves, respectively, wherein when the blade held by the blade holding means is relatively moved with respect to the shell during the initial fitting, the at least one of the claws of the blade is arranged on the near side of the corresponding groove of the shell along a movement direction in which the at least one of the claws of the blade moves with respect to the corresponding groove in the circumferential direction of the shell, and thereafter, the at least one of the claws is slid in the direction toward the corresponding groove and inserted so as to fall in the corresponding groove while being pressed downwardly against the upper surface of the shell by the holding force of the blade holding means, the blade holding means is formed by an elastic member which bends by an amount corresponding to elastic deformation to displaceably hold the blade.

2. The blade assembling method for a torque converter according to claim 1, wherein after all the claws of the blade are inserted into all the corresponding grooves of the shell, respectively, the blade is downwardly pressed against the upper surface of the shell by a pressing force, and all the claws are thrusted into all the corresponding grooves, respectively, up to roots thereof.

3. The blade assembling method for a torque converter according to claim 2, wherein
the blade holding means bends by an amount corresponding to elastic deformation to displaceably hold the blade.

4. The blade assembling device for a torque converter according to claim 1, wherein
the blade insertion means is provided at a tip end of an arm of a robot.

5. A blade assembling device for a torque converter that assembles a blade having a plurality of claws at an outer edge thereof to a shell having multiple sets of groove lines at respective positions along a circumferential direction thereof, the plurality of claws mutually corresponding to a plurality of grooves constituting the respective groove lines, the blade assembling device comprising:
a shell holding board that holds the shell; and
blade insertion means that holds a blade surface on one side of the blade by blade holding means and relatively moves the blade with respect to the shell, to thereby perform initial fitting by inserting at least one of the claws of the blade into a corresponding groove in the groove line of the shell, and after the insertion of the at least one of the claws by the initial fitting, arranges a remaining claw of the blade on a near side of a corresponding groove in the circumferential direction of the shell, further relatively moves the blade held by the blade holding means with respect to the shell, and slides the remaining claw of the blade toward the corresponding groove from the near side of the corresponding groove and inserts the remaining claw so as to fall in the groove while pressing the remaining claw in an oblique downward direction against an upper surface of the shell by a holding force of the blade holding means, to thereby insert all the claws into all the corresponding grooves, respectively, wherein
when relatively moving the blade held by the blade holding means with respect to the shell during the initial fitting, the blade insertion means arranges the at least one of the claws of the blade on the near side of the corresponding groove in the circumferential direction of the shell, and thereafter, slides the at least one of the claws in the direction toward the corresponding groove from the near side of the groove and inserts the at least one of the claws so as to fall in the corresponding groove while pressing the at least one of the claws in the oblique downward direction against the upper surface of the shell by the holding force of the blade holding means,
the blade holding means is formed by an elastic member which bends by an amount corresponding to elastic deformation to displaceably hold the blade.

6. The blade assembling device for a torque converter according to claim 5, wherein
the blade insertion means includes a pressing part that, after all the claws of the blade are inserted into all the corresponding grooves of the shell, respectively, downwardly presses the blade against the upper surface of the shell by a pressing force and thrusts all the claws into all the corresponding grooves, respectively, up to roots thereof.

7. The blade assembling device for a torque converter according to claim 6, wherein
the blade holding means bends by an amount corresponding to elastic deformation to displaceably hold the blade.

8. The blade assembling device for a torque converter according to claim 6, wherein
the blade insertion means is provided at a tip end of an arm of a robot.

9. The blade assembling device for a torque converter according to claim 5, wherein
the blade insertion means is provided at a tip end of an arm of a robot.

* * * * *